United States Patent
Allison (10) Patent No.: US 6,260,503 B1
(45) Date of Patent: Jul. 17, 2001

(54) CHANNELED AIR PLANING APPARATUS

(76) Inventor: Darris E. Allison, 106 Main St., Louisville, TN (US) 37777

(*) Notice: Subject to any disclaimer, the term of this patent is extended or adjusted under 35 U.S.C. 154(b) by 0 days.

(21) Appl. No.: 09/640,895

(22) Filed: Aug. 18, 2000

(51) Int. Cl.$^7$ ....................................................... B63B 1/24
(52) U.S. Cl. ........................... 114/274; 114/291; 114/288
(58) Field of Search ....................................... 114/274, 288, 114/289, 291, 280–282; 440/69; D12/300, 309, 313

(56) References Cited

U.S. PATENT DOCUMENTS

| | | |
|---|---|---|
| 3,998,176 | 12/1976 | Stout et al. |
| 4,165,703 | 8/1979 | Burg. |
| 4,398,483 | 8/1983 | Wood et al. |
| 4,584,959 | 4/1986 | Allison. |
| 4,649,851 | 3/1987 | April. |
| 4,689,026 * | 8/1987 | Small ........................................ 440/66 |
| 4,748,929 * | 6/1988 | Payne ..................................... 114/280 |
| 4,896,621 | 1/1990 | Coles. |
| 4,903,626 | 2/1990 | Haine. |
| 5,231,945 | 8/1993 | Ackerbloom. |
| 5,315,951 | 5/1994 | Finkl. |
| 5,351,641 | 10/1994 | Robson. |
| 5,645,009 | 7/1997 | Lexau. |

* cited by examiner

*Primary Examiner*—Ed Swinehart
(74) *Attorney, Agent, or Firm*—Luedeka, Neely & Graham, P.C.

(57) ABSTRACT

A channeled air planing apparatus improves low speed performance of boats without adversely affecting high speed performance. The apparatus includes structural elements for channeling air to a transverse step adjacent a running surface. Air channeled to the transverse step eliminates low pressure at the step caused by flow of water past the step, which in turn enhances low speed performance by lowering the bow of the boat and reducing drag on wetted propulsion equipment and other aft boat structure. In a preferred embodiment, the channeled air planing foil includes a lower hydrofoil member attached to a setback area of the boat by a pair of substantially parallel sidewalls aft and above the boat's running surface. When the boat is at rest, a channel defined by the lower hydrofoil element and sidewalls contains water. As the boat moves forwardly through the water during takeoff, water is evacuated from the channel and replaced with air which ventilates the transverse step. The lower hydrofoil element also functions to provide lift to the stern, which further reduces drag and enhances the boat's ability to reach plane. In another embodiment, air channels are formed in a setback area of the boat to channel air forwardly to the transverse step during takeoff. Once planing speed is achieved, the channel air planing apparatus is completely out of the water and does not adversely affect high speed performance.

24 Claims, 7 Drawing Sheets

CHANNELED AIR PLANING APPARATUS

BACKGROUND

1. Field of the Invention

The present invention relates generally to boat structure. More particularly, the present invention relates to boat aft structure which improves low speed performance without adversely affecting high speed performance.

2. Background of the Invention

Propulsion systems for high performance boats commonly employ a setback transom to which an outboard motor is mounted. The transom is "setback" in the sense that the transom is extended rearward of the trailing edges of the underside running surface. Other high performance boats employ a stern drive design where a large motor (often a V-8 car engine or other large engine) is mounted inboard with a propeller outdrive which extends through the transom. While both designs are advantageous once the boat achieves planing speed, low speed performance is adversely affected.

Setback transoms are usually configured in one of two ways. First, a metal bracket (typically in the form of a box which is open at the top and bottom) is attached to the stern of the boat to rearwardly extend the mounting position of the outboard motor. Setting the outboard motor back from the rearward trailing edges of the running surface provides leverage which helps to lift the bow out of the water at high speeds. This reduces the wetted area on the running surfaces with resultant reduction in hydrodynamic drag, thereby allowing the boat to go faster. The amount of leverage desired will dictate the distance the motor is extended rearward of the trailing edge of the boat's running surfaces.

Although the rearward placement of the motor produces desired leverage to lift the bow out of the water during high speed operation, it also causes the stern to sink and the bow to rise during take-off as the boat is trying to come up on plane (also commonly referred to as the "hole shot"). This is undesirable as it increases the boat's hole shot time (i.e., the amount of time required for the boat to achieve planing speed). The setback extension bracket also reduces the stern's buoyancy, which sinks the stern of the boat deeper into the water. This added depth of the motor increases hydrodynamic drag on the lower and mid-section of the motor as well as the setback bracket itself. The motor and the propeller have to overcome this added drag for the boat to come up on plane. In some cases, the boat is unable to achieve planing speed because the increased drag is too great. Thus, while setback motors can dramatically improve the boat's high speed performance, they can be devastating to the boat's ability to plane.

Another method often used to setback an outboard motor is to build a setback transom into the boat. The setback transom effectively creates a step from the trailing edge of the running surface to the surface of the transom itself. While the setback transom provides greater buoyancy at the stern than does a setback bracket, hole shot performance is still hindered as a result of the step. When the boat is sitting at rest, the step under the transom is completely submerged. As the boat begins to move through the water during takeoff, water passes over the step. Since the step is completely submerged and unventilated, the step creates a vacuum which sucks the stern down into the water, thus hindering the boat's ability to come up on plane. The boat cannot plane until this vacuum is released. At the same time, water flows off the step and drags on the lower and mid-section of the motor, which further hinders the boat's ability to reach planing speed.

High performance boats which use a stern drive propulsion system are excessively heavy due to the large, heavy engine placed at the stern with an outdrive through the transom. Although most stern drives are not set back like outboard motors, they are always sluggish out of the hole because the heavy stern has a similar effect of lifting the bow out of the water while sinking the stern into the water. The result is increased drag on the outdrive and aft running surfaces as the boat is coming up on plane. In addition, due to the engine's limited RPM at top speed, larger propellers are needed to keep the engine from over-reving. As a result, low end acceleration is sacrificed.

Efforts to improve the low end performance of high performance boats include the use of fixed and movable trim tabs in a variety of configurations. While such trim tabs assist in planing the boat, they also induce drag and slow the boat's top speed, acceleration, and fuel efficiency.

Thus, there is a need for boat hydro-planing structure which enhances the ability of high performance watercraft to achieve planing speed without adversely affecting the boat's performance once planing speed is achieved.

SUMMARY OF THE INVENTION

The present invention eliminates the difficulties and disadvantages of the prior art by providing a channeled air planing apparatus which significantly improves low end boat performance without adversely affecting high end performance. The channeled air planing apparatus includes at least one air channel adjacent the undersurface of a boat for channeling air from the stern forwardly to a transverse step adjacent the boat's undersurface. Air channeled to the transverse step breaks a vacuum or low pressure area at the transverse step and allows the boat to more quickly and easily achieve planing speed.

In one preferred embodiment, the at least one air channel is formed by structure which includes a hydro-planing foil for being attached to a boat having an outboard propulsion element and a running surface forward of the outboard propulsion element. The hydro-planing foil includes a lower hydrofoil element having a first end in opposed relation to a second end defining a length therebetween, and a first edge in opposed relation to a second edge. Two sidewalls attach the lower hydrofoil element to the boat aft and above a running surface and forward of the outboard propulsion unit. Each of the sidewalls have a lower end connected to the lower hydrofoil element and an upper end for being attached to the boat. A channel is defined between the lower hydrofoil element and the two sidewalls when the hydro-planing foil is attached to the boat. When the hydro-planing foil is attached to the boat and the boat is sitting at rest in the water, the lower hydrofoil element is below the water surface with the channel containing water. When the boat is at planing speed, the lower hydrofoil element is above the water surface with the channel being substantially evacuated of water.

In another preferred embodiment of the present invention, the at least one air channel includes an open bottom air channel adjacent the undersurface of the boat. The open bottom air channel is preferably formed at the trailing edge of a diagonal step. Water flowing beneath the boat passes over the diagonal step, which allows air to enter and travel forwardly to ventilate a transverse step adjacent a running surface of the boat.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings, which are not to scale, where:

DETAILED DESCRIPTION OF THE PREFERRED EMBODIMENT(S)

Figure 1:
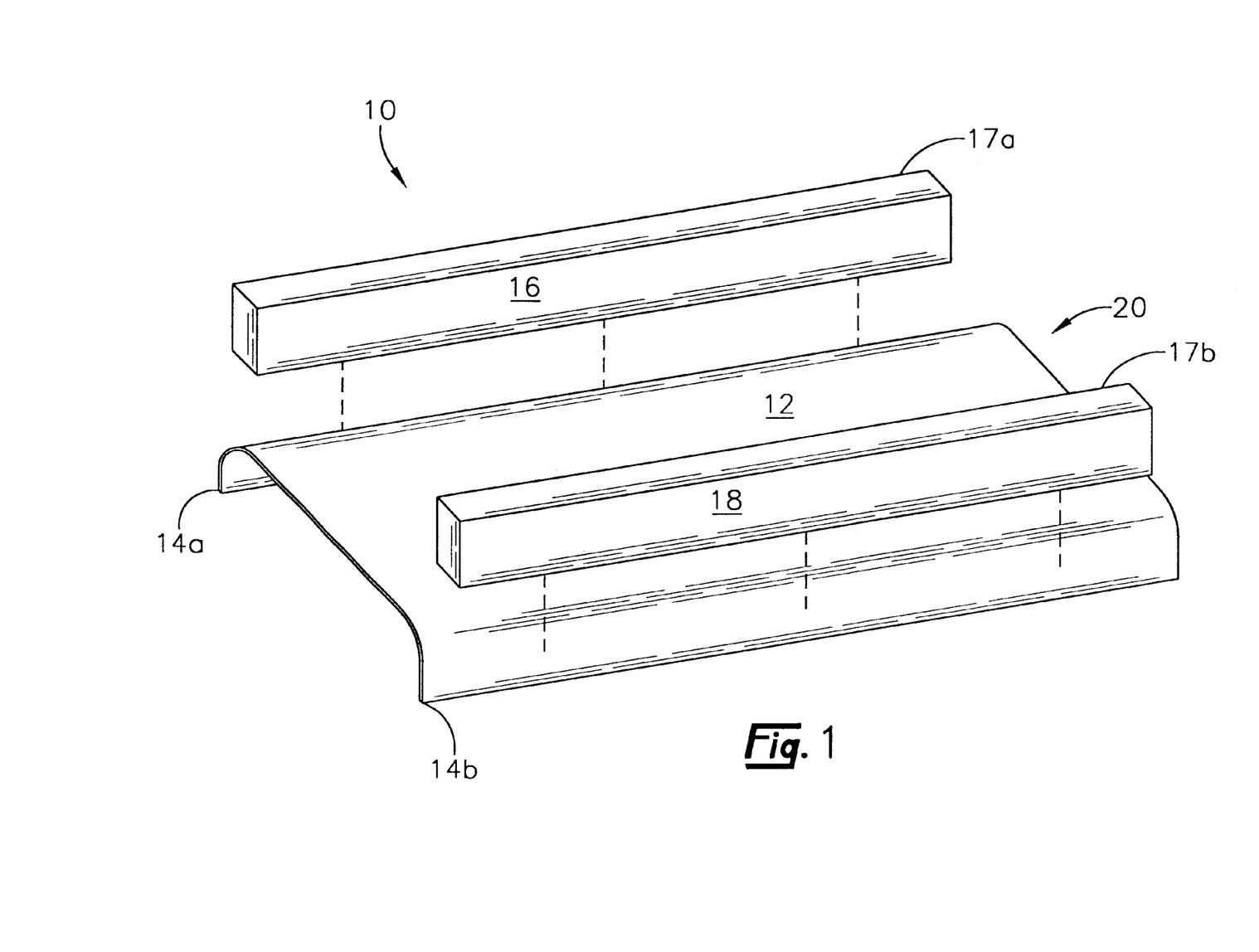
FIG. 1 is an exploded view of a channeled air hydroplaning foil according to the invention.

With reference now to the drawings in which like reference characters designate like or similar parts throughout the several views, FIG. 1 illustrates a channeled air hydro-planing foil 10 for enhancing hole shot performance of high speed watercraft. The hydro-planing foil 10 of FIG. 1 includes a lower hydrofoil element 12 which is substantially planar. In a preferred embodiment, the outer edges 14a, 14b of hydrofoil element 12 are downwardly turned to a negative dihedral angle of about 20–45 degrees. The hydrofoil element 12 is fabricated from a rigid material such as aluminum or plastic. A pair of sidewalls 16, 18 are attached to the upper surface of the hydrofoil element 12 adjacent edges 14a, 14b to form a channel as generally indicated at 20 which allows air to be moved forwardly adjacent the undersurface of the watercraft to enhance its ability to achieve planing speed. As further described below, the hydro-planing foil 10 is secured to a boat by attaching the upper ends 17a, 17b of the sidewalls 16, 18 to the boat's aft structure.

Figure 2:
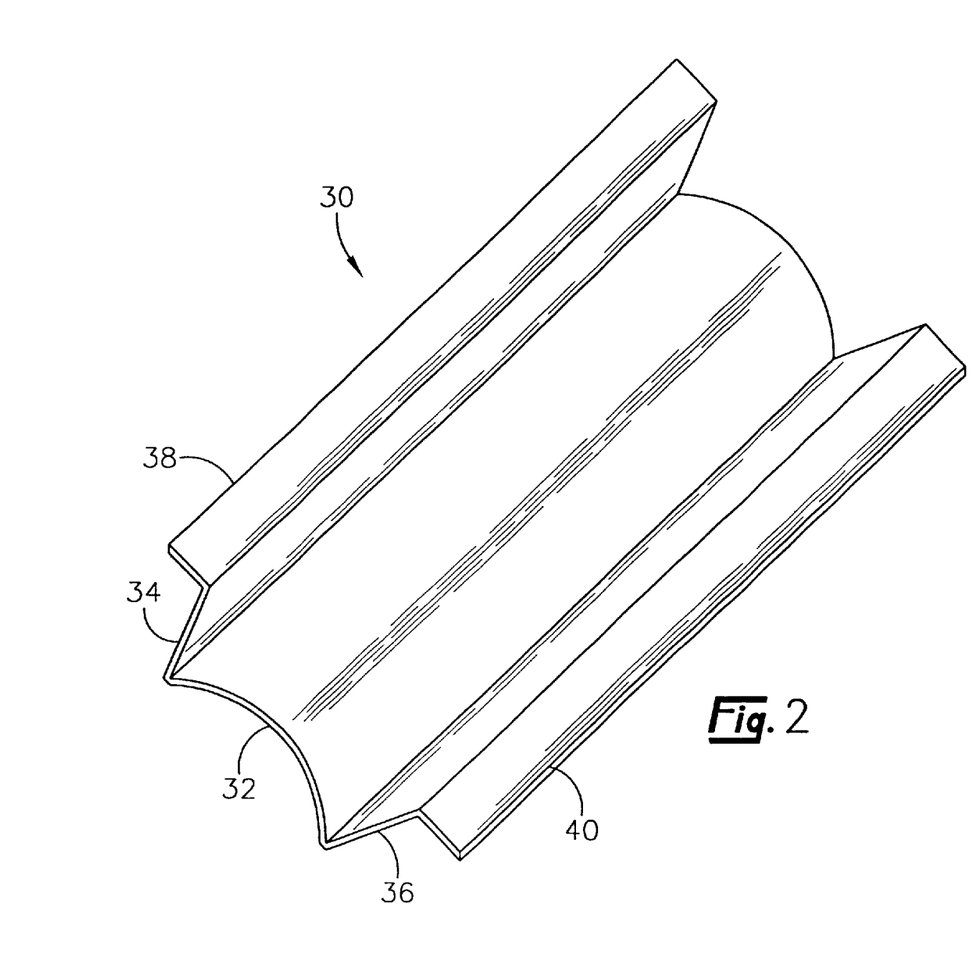
FIG. 2 is a perspective view of an alternate embodiment of a channeled air hydro-planing foil according to the invention.

FIG. 2 shows another preferred embodiment of a channeled air hydro-planing foil 30 according to the invention. The hydro-planing foil 30 includes a lower hydrofoil element 32 and a pair of sidewalls 34, 36 attached to the lower hydrofoil element 32. Flanges 38, 40 are employed to attach the foil 30 to the boat, either directly or by way of intermediate structure (such as angle brackets) that is used to interconnect the foil 30 and boat. Use of either embodiment (FIG. 1 or 2) has been shown to reduce a boat's hole shot time by more than 65%.

Figure 3:
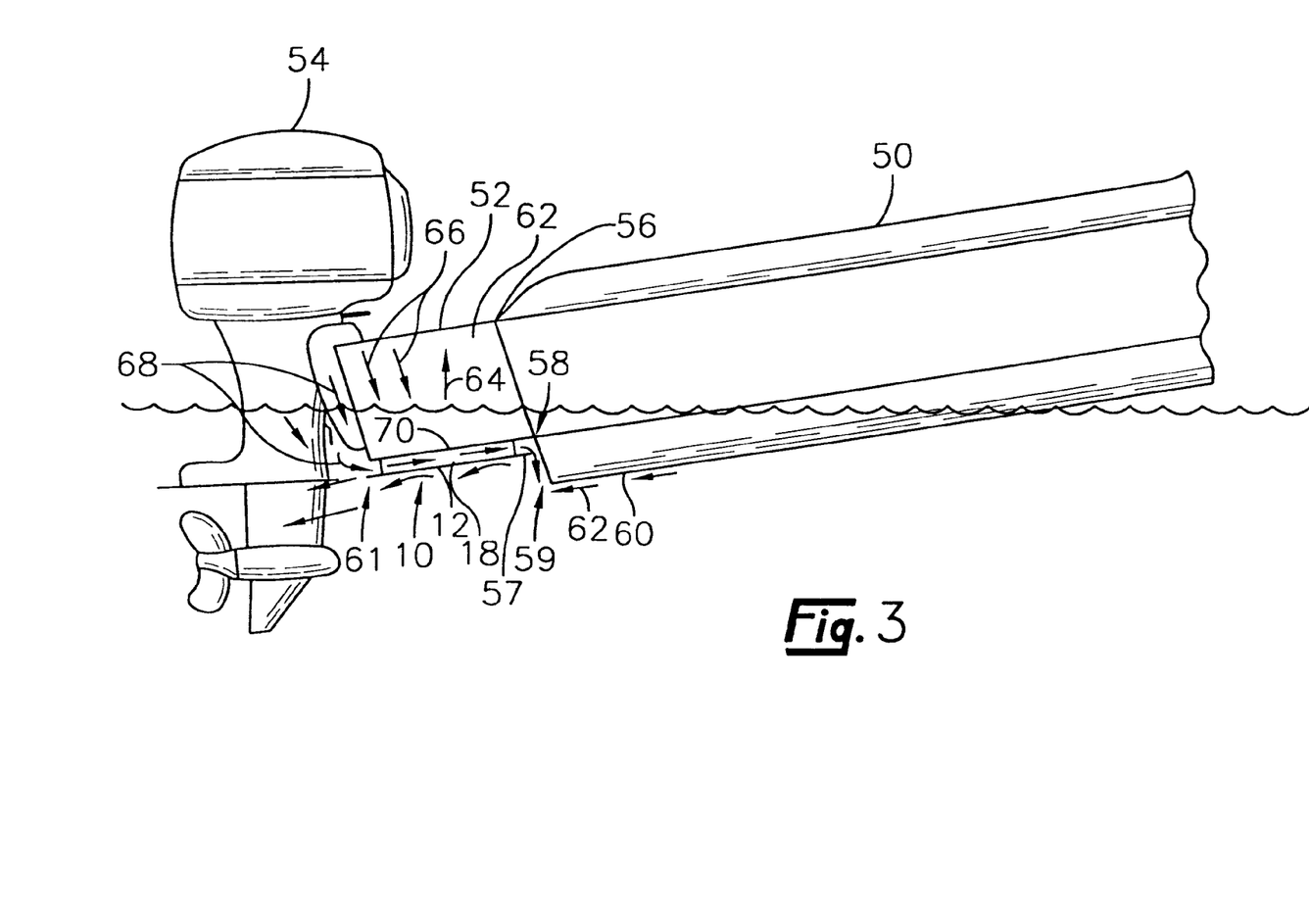
FIG. 3 is a side view showing the hydro-planing foil of FIG. 1 attached to a high speed boat during takeoff.

FIG. 3 shows the hydro-planing foil 10 of FIG. 1 attached to a high speed boat 50 having a setback 52 for setting an outboard motor 54 back from the transom 56. The setback 52 may be in the form of a jack plate, which is essentially an aluminum box (typically open at both the top and bottom) that is attached to the transom 56, or the setback 52 may be a permanently built-in portion of the boat 50 with the built-in setback having a closed bottom. Setting the motor 54 back from the transom is desirable in a high speed boat since it gives the motor 54 more leverage to lift the nose of the boat out of the water during high speed operation. Higher speeds can be reached with greater fuel efficiency. However, hole shot performance suffers as motor setback increases.

It will be appreciated that one reason why hole shot performance suffers in a boat having a setback 52 is that the setback 52 must be stepped up above the boat's running surface 60, creating a transverse step 58 along the lower surface of the boat 50 at the interface of the transom 56 and setback 52. As the boat 50 moves through the water (as during takeoff), water passes along the running surface 60 and past the transom 56 as generally indicated by water flow indication arrows 62. Movement of the water past the step 58 produces an area of low pressure at the step 58, which forces the transom 56 down into the water. This in turn increases drag as the setback 52 and motor 54 are forced further down into the water. The boat 50 will not come up on plane until the motor 54 produces enough power to push the boat up and break the vacuum or low pressure area at the step 58.

Another reason the setback 52 hinders takeoff is that most jack plates are open at the bottom, so the jack plate causes enormous drag as it scoops water. The added setback also increases the amount of the motor 54 that is in the water during takeoff, which adds even more drag.

With continued reference to FIG. 3, the hydro-planing foil 10 of FIG. 1 is shown attached to the bottom of the setback 52 above running surface 60. An opening or gap 59 (which may be in the form of a notch in the leading edge of the lower hydrofoil element 12) is preferably provided between the forward edge 57 of the lower hydrofoil element 12 and the transom 56 to enhance ventilation of the step 58, as described below. If the boat 50 incorporates a setback 52 in the form of an open bottom jack plate, the sidewalls 16, 18 (FIG. 1) of the hydro-planing foil 10 are preferably attached to the outer vertical surfaces of the jack plate so that the sidewalls 16, 18 are effectively extended above the surface of the water. The sidewalls 16, 18 need not be flush with the outer vertical surfaces of the jack plate, nor do the sidewalls 16, 18 need to extend above the surface of the water to enhance the boat's ability to get on plane.

FIG. 3 shows how sidewall 18 is attached to outer vertical surface 62, resulting in an effective sidewall that extends from the lower hydrofoil element 12 to the top portion of the setback 52 extending above the water surface. With the hydro-planing foil 10 attached to the jack plate in this manner, a channel is defined by the sidewalls 16, 18 (including jack plate outer vertical surfaces) and lower hydrofoil element 12. If the boat 50 incorporates a built-in setback 52 or a closed bottom jack plate, the sidewalls 16, 18 are attached to the underside of the bottom 70 so as to create a channel in the form of a tunnel defined by the sidewalls 16, 18, lower hydrofoil element 12, and setback bottom 70 (forming the top portion of the tunnel).

Figure 4:
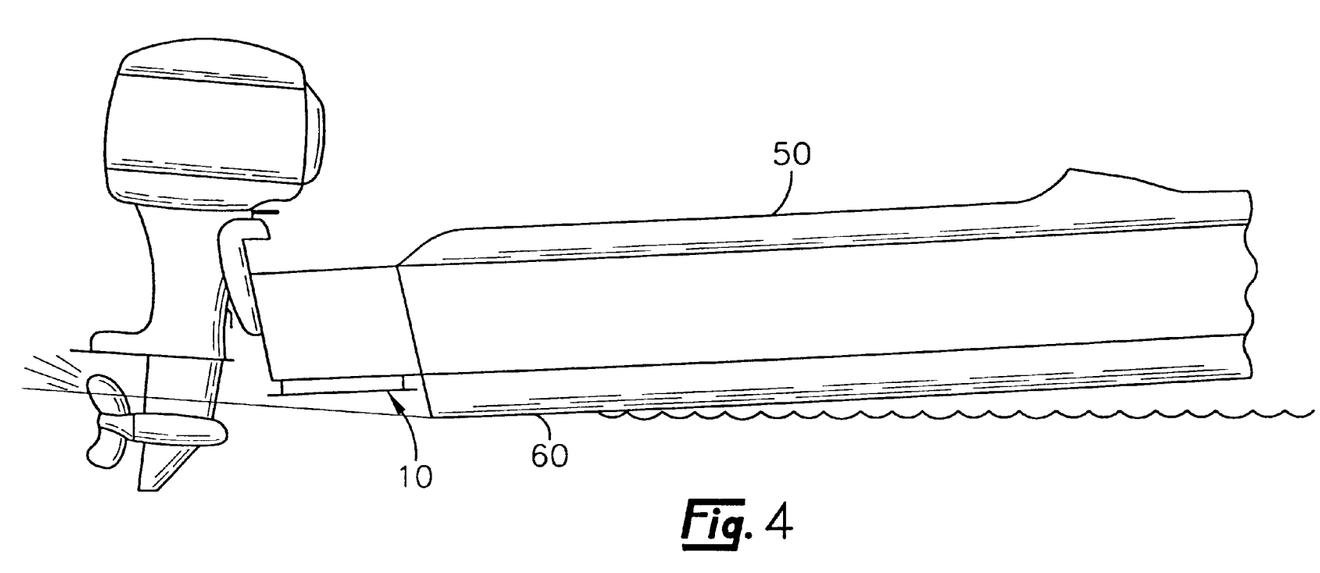
FIG. 4 is a side view of the hydro-planing foil of FIG. 1 attached to a high speed boat during high speed operation.

The hydro-planing foil 10 improves the boat's hole shot performance in numerous ways. For example, during takeoff as the boat 50 begins to move forwardly, water passing over the step 58 comes into contact with the lower hydrofoil element 12 giving the stern of the boat 50 lift as indicated at arrow 64. Lift created by the hydro-planing foil 10 lowers the bow of the boat 50 and reduces the boat's angle of attack to the water (i.e., the boat 50 does not have to climb as steep of an angle to reach plane). The lower hydrofoil element 12 also deflects water away from the jack plate (or other setback structure) and the motor 54, which has the effect of reducing drag. The sidewalls 16, 18 that form the channel inhibit water from spilling over the sides of the lower hydrofoil element 12 while allowing water above the lower hydrofoil element 12 to purge rearward. Once the boat 50 reaches planing speed with the boat 50 running on running surface 60 as shown in FIG. 4, the hydro-planing foil 10 is completely out of the water and does not hinder high speed performance. The hydro-planing foil 10 may also prevent a disastrous blow over of the boat 50 by keeping the nose of the boat 50 from getting too high as a result of driver error or a gust of wind lifting the nose up during high speed operation.

Another important way in which the hydro-planing foil 10 improves hole shot performance is by eliminating low pressure at the step 58. When the boat 50 begins to move forwardly during takeoff, water which was occupying the channel defined by the sidewalls 16, 18 and lower hydrofoil element 12 purges rearward. This allows air to enter into the channel and ventilate the step 58, thus breaking or preventing the formation of a vacuum or other low pressure area at the step 58 which would otherwise force the stern down into the water. For an open bottom jack plate, air which ventilates the step 58 enters from the open top portion of the jack plate (shown by arrows 66) as well as from the bottom of the rear portion (shown by arrows 68) just above the lower hydrofoil element 12. For a boat having a built-in set back 52 or a jack plate with a closed bottom 70, air travels downwardly along the trailing edge of the setback 52 (see arrows 68), enters a tunnel defined by the sidewalls 16, 18, lower hydrofoil element 12, and the closed setback bottom 70, and moves forwardly through the tunnel to ventilate the step 58.

Thus, a hydro-planing foil according to the invention enables a boat to reach planing speed 2 or 3 times quicker on much less power and effort with no degradation of high speed performance. This allows for larger propellers, greater setbacks, more speed, better acceleration, less fuel consumption, and the ability to use smaller engines on larger boats.

Figure 5A:
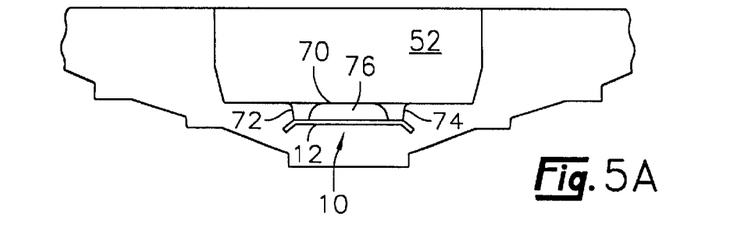
FIGS. 5A through 5E are rear views showing various embodiments of a hydro-planing foil attached to a boat according to the invention.

FIGS. 5A–E show four different types of installation for a channeled air planing foil according to the invention. FIG. 5A shows the hydro-planing foil 10 of FIG. 1 attached to a pair of parallel bosses 72, 74 molded into the bottom 70 of a built-in setback 52. The bosses 72, 74 provide the function of the sidewalls 16, 18 shown in FIG. 1. A channel in the form of a tunnel 76 for ventilating the step 58 is defined by the lower hydrofoil element 12, bosses 72, 74, and the setback bottom 70.

Figure 5B:
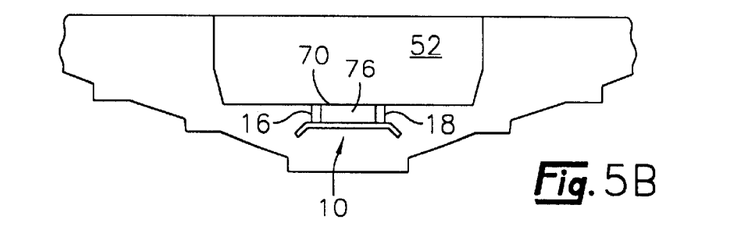

FIG. 5B shows the hydro-planing foil 10 of FIG. 1 with the sidewalls 16, 18 attached to the bottom 70 of a built-in setback 52 to form a step ventilation tunnel 76.

Figure 5C:
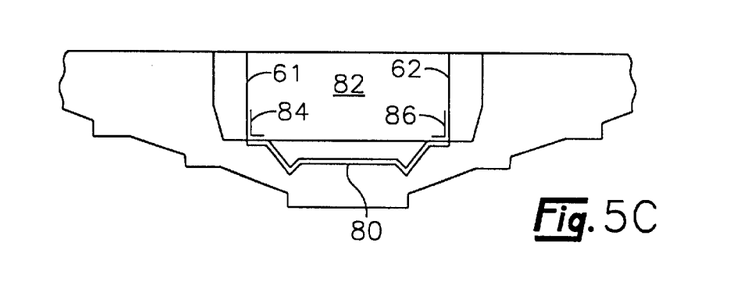

FIG. 5C shows another embodiment of a hydro-planing foil 80 attached to the outer vertical surfaces 61, 62 of an open bottom jack plate 82. In a preferred embodiment, angle brackets 84, 86 are used to bolt the hydro-planing foil 80 to the jack plate 82. The angle brackets 84, 86 add to the structural integrity of the installation, and they facilitate replacement of the hydro-planing foil 80.

Figure 5D:
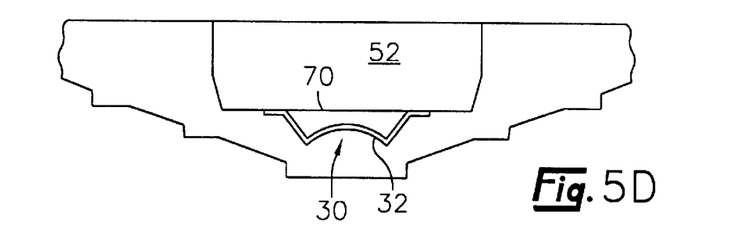

FIG. 5D shows the hydro-planing foil 30 of FIG. 2 attached directly to the bottom 70 of a closed bottom setback 52. The curved or concave portion 32 of the foil 30 funnels water to the boat's propeller allowing it to be more efficient.

Figure 5E:
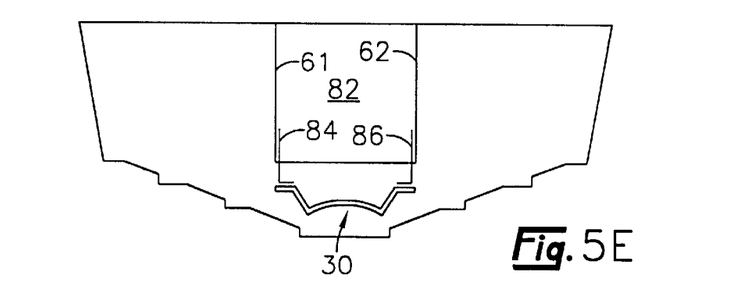

FIG. 5E shows the hydro-planing foil 30 of FIG. 2 attached to the outer vertical surfaces 61, 62 of an open bottom jack plate 82 by way of angle brackets 84, 86. As will be appreciated, the angle brackets 84, 86 can be used to adjust the height of the foil 30 above the boat's running surface 60 (FIG. 3).

Figure 6:
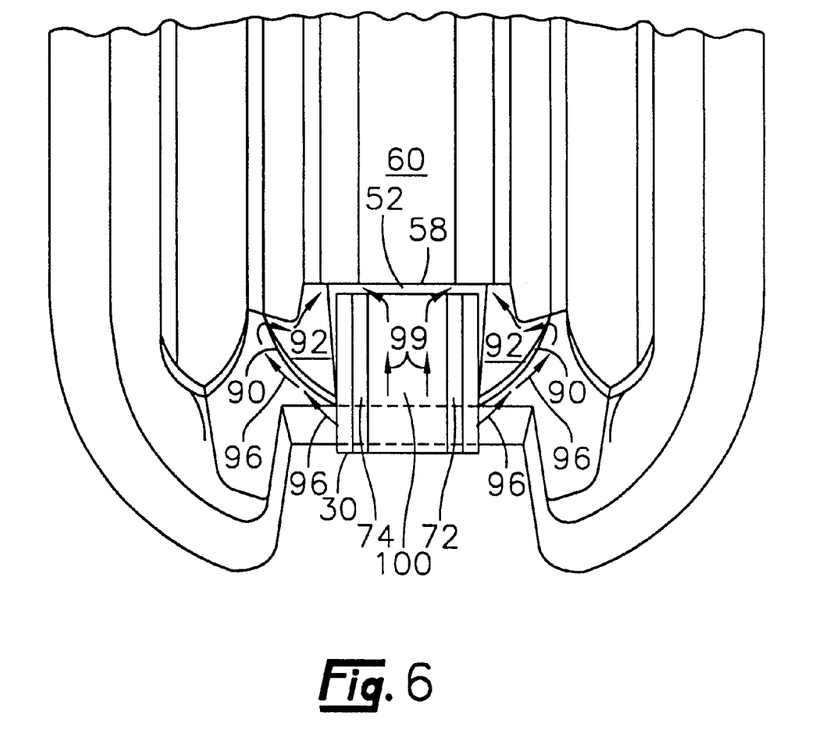
FIG. 6 is a partial bottom view of a high speed boat with molded-in air channels for improving takeoff performance according to the invention.
Figure 7:
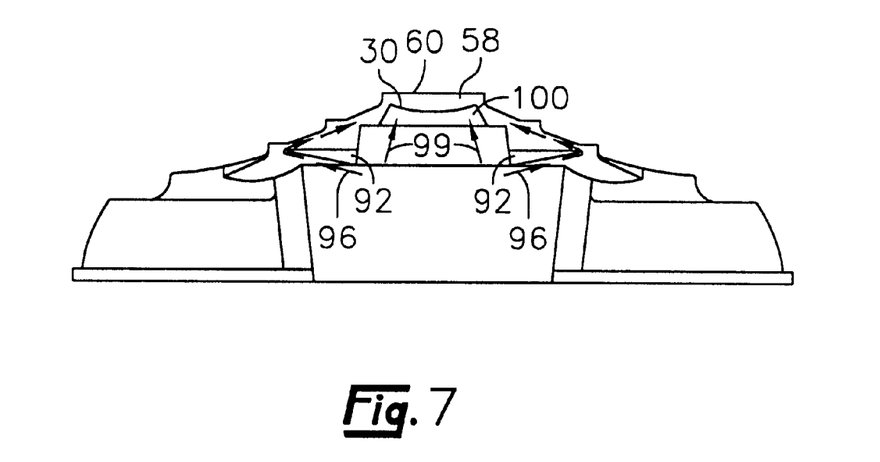
FIG. 7 is a rear view of a high speed boat hull turned upside down showing the molded-in air channels of FIG. 6.

Another embodiment of the invention which channels air to ventilate the step 58 (FIG. 3) is shown in FIGS. 6 and 7. In this embodiment, one or more open bottom air channels 90 are formed at the trailing edges of diagonal steps 92 which are positioned adjacent a built-in setback 52. The air channels 90 function to channel air forwardly to ventilate the step 58.

With continued reference to FIGS. 6 and 7, as the boat moves through the water during takeoff, water flowing beneath the boat breaks off the trailing edges of the diagonal steps 92 allowing air to enter the channels 90 on each side of the setback 52 as generally shown by air flow arrows 96. Air entering channels 90 is channeled forward as shown to ventilate the step 58 at the trailing edge of running surface 60, thereby breaking the vacuum or low pressure at the step 58 and lowering the bow of the boat.

Also, as shown in FIGS. 6 and 7, a hydro-planing foil may be employed in conjunction with the molded-in air channels 90 to create one or more additional air channels which further assist in ventilating the step 58 (as shown by air flow arrows 99) and add lift to stern of the boat. For purposes of illustration and without limitation to the type of hydro-planing foil that may be employed, FIGS. 6 and 7 show a hydro-planing foil 30 of the type shown in FIG. 2 to create an air channel 100.

Figure 8:
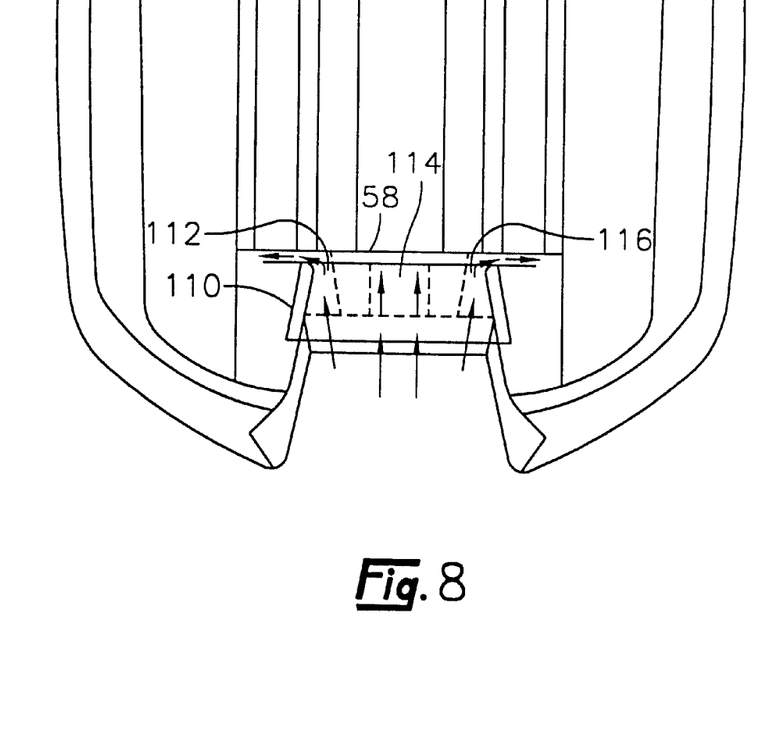
FIG. 8 is a partial bottom view of a high speed boat with hydro-planing foil forming multiple air channels.
Figure 9:
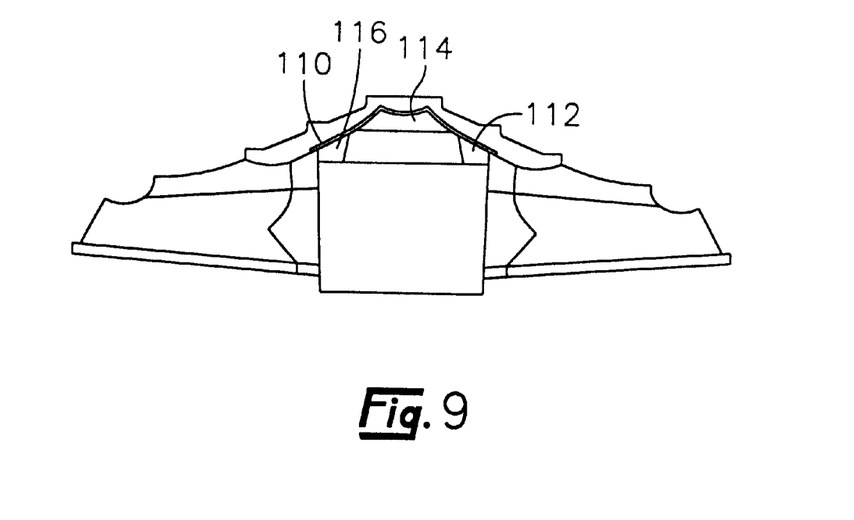
FIG. 9 is a rear view of a high speed boat hull turned upside down showing multiple air channels formed by a single hydro-planing foil.

FIGS. 8 and 9 show a further embodiment of the invention which utilizes a single hydro-planing foil 110 to create multiple air channels 112, 114, and 116 for channeling air forwardly to ventilate the step 58.

While the invention has been described in detail, it is to be expressly understood that it will be apparent to persons skilled in the relevant art that various changes of form, design or arrangement may be made to the invention without departing from the spirit and scope of the invention. For example, while the above description of preferred embodiments shows the invention used on boats with outboard motors, the invention may also be employed with beneficial results on stern drive boats having relatively large engines that are inboard with an outboard propulsion element such as a propeller, (commonly referred to as an outdrive) extending through the transom of the boat. Stern drive boats are excessively stern heavy due to the large inboard engine placed at the stern and the outdrive which extends through the transom. As a result, stern drive boats are sluggish out of the hole during takeoff. Use of the present invention on stern drive boats has the same or similar benefits as those discussed above by lifting the stern and keeping the bow down during takeoff and reducing drag at the outdrive. Therefore, the above mentioned description is to be considered exemplary, rather than limiting, and the true scope of the invention is that defined in the following claims.

What is claimed is:

1. A hydro-planing foil for being attached to a boat having an outboard propulsion element and a running surface forward of the outboard propulsion element, the propulsion element and the running surface separated by a distance, the hydro-planing foil comprising:

a lower hydrofoil element having:
    a first end in opposed relation to a second end and defining a length therebetween; and
    a first edge in opposed relation to a second edge;

a first sidewall for attaching the lower hydrofoil element to the boat aft and above a running surface and forward of the outboard propulsion unit, said first sidewall having a lower end connected adjacent the lower hydrofoil element first edge and an upper end for being attached to the boat;

a second sidewall for attaching the lower hydrofoil element to the boat aft and above a running surface and forward of the outboard propulsion unit, said second sidewall having a lower end connected adjacent the lower hydrofoil element second edge and an upper end for being attached to the boat; and wherein a channel is defined between the lower hydrofoil element and the first and second sidewalls when the hydro-planing foil is attached to the boat, said lower hydrofoil element being below the water surface and said channel containing water when the boat is at rest, said lower hydrofoil element being above the water surface and said channel being substantially evacuated of water when the boat is at planing speed.

2. The hydro-planing foil of claim 1 wherein said lower hydrofoil element includes a substantially planar portion.

3. The hydro-planing foil of claim 1 wherein said lower hydrofoil element includes a concave portion.

4. The hydro-planing foil of claim 1 wherein the first and second edges of said lower hydrofoil element are curved to form a negative dihedral.

5. The hydro-planing foil of claim 1 wherein said first and second sidewalls are substantially perpendicular to said lower hydrofoil element.

6. The hydro-planing foil of claim 1 wherein said first and second sidewalls are integral with the boat.

7. The hydro-planing foil of claim 1 wherein the length of the lower hydrofoil element is less than the distance separating the outboard propulsion element from the running surface.

8. The hydro-planing foil of claim 1 wherein the length of the lower hydrofoil element is greater than the length of the first and second sidewalls.

9. The hydro-planing foil of claim 1 wherein the length of the lower hydrofoil element is substantially equal to the length of the first and second sidewalls.

10. The hydro-planing foil of claim 1, further comprising:
   a first bracket for interconnecting the first sidewall and the boat; and
   a second bracket for interconnecting the second sidewall and the boat;
   said first and second brackets forming a portion of the channel.

11. A high speed planing boat comprising:
   a bow;
   a stern in opposed relation to the bow;
   an outboard propulsion element adjacent the stern;
   a planing surface forward of the outboard propulsion element;
   a hydro-planing foil intermediate the outboard propulsion element and the planing surface and above the planing surface, said hydro-planing foil including:
      a lower hydrofoil element having:
         a first end in opposed relation to a second end and defining a length therebetween; and
         a first edge in opposed relation to a second edge;
      a first sidewall having a lower end attached to the lower hydrofoil element adjacent the first edge and an upper end attached to the boat;
      a second sidewall having a lower end attached to the lower hydrofoil element adjacent the second edge and an upper end attached to the boat; and
      wherein a channel is defined between the lower hydrofoil element and the first and second sidewalls, said lower hydrofoil element being below the water surface and said channel containing water when the boat is at rest, said lower hydrofoil element being above the water surface and said channel being substantially evacuated of water when the boat is at planing speed.

12. The high speed planing boat of claim 11 wherein said lower hydrofoil element includes a substantially planar portion.

13. The high speed planing boat of claim 11 wherein said lower hydrofoil element includes a concave portion.

14. The high speed planing boat of claim 11 wherein the first and second edges of said lower hydrofoil element are curved to form a negative dihedral.

15. The high speed planing boat of claim 11, further including a top to which the upper ends of the first and second sidewalls are attached, wherein a tunnel is defined by the lower hydrofoil element, the first and second sidewalls, and the top.

16. The high speed planing boat of claim 11 wherein said first and second sidewalls are substantially perpendicular to said lower hydrofoil element.

17. The high speed planing boat of claim 11 wherein the length of the lower hydrofoil element is less than the distance separating the outboard propulsion element from the running surface.

18. The high speed planing boat of claim 11 wherein the length of the lower hydrofoil element is greater than the length of the first and second sidewalls.

19. The high speed planing boat of claim 11, further comprising:
   at least one air channel formed in the undersurface of the boat for channeling air from the stern forwardly to the trailing edge of a running surface as the boat moves forwardly through the water during takeoff; and
   wherein air moving forwardly thorugh said air channel causes evacuation of water adjacent said trailing edge of a running surface and enhances the ability of the boat to achieve plane during takeoff.

20. In a boat hull having a bow, a stern, an outboard propulsion element aft of the stern, and an undersurface with a transverse step intermediate the stern and the bow which extends partially the width of the undersurface, the improvement comprising:
   at least one air channel adjacent the undersurface of the boat for channeling air from the stern forwardly to the transverse step as the boat moves forwardly through the water during takeoff; and
   wherein air moving forwardly through said air channel causes evacuation of water adjacent the transverse step and enhances the ability of the boat to achieve plane during takeoff.

21. The improvement of claim 20 wherein said air channel is configured to channel air substantially in said forward direction.

22. The improvement of claim 20 wherein said air channel is configured to channel air in a direction offset to said forward direction.

23. The improvement of claim 20, further comprising a hydro-planing foil positioned aft and above said transverse step to receive water passing over the transverse step and to provide lift to the stern.

24. The improvement of claim 23, further comprising:
   a first sidewall for attaching the hydro-planing foil to the boat;
   a second sidewall for attaching the hydro-planing foil to the boat; and
   wherein a channel is defined between the hydro-planing foil and the first and second sidewalls, said hydro-planing foil being below the water surface and said channel containing water when the boat is at rest, said hydro-planing foil being above the water surface and said channel being substantially evacuated of water when the boat is at planing speed.

* * * * *